(12) United States Patent
Brouwer

(10) Patent No.: US 6,799,504 B2
(45) Date of Patent: Oct. 5, 2004

(54) APPARATUS FOR PREPARING A COFFEE EXTRACT WITH A FINE-BUBBLE FROTH LAYER USING A LIQUID FLOW DECELERATING BARRIER

(75) Inventor: Gustaaf Frans Brouwer, Nijkerk (NL)

(73) Assignee: Sara Lee/DE N.V., Utrecht (NL)

( * ) Notice: Subject to any disclaimer, the term of this patent is extended or adjusted under 35 U.S.C. 154(b) by 0 days.

(21) Appl. No.: 10/363,631

(22) PCT Filed: Sep. 5, 2001

(86) PCT No.: PCT/NL01/00655
§ 371 (c)(1),
(2), (4) Date: Jun. 25, 2003

(87) PCT Pub. No.: WO02/19876
PCT Pub. Date: Mar. 14, 2002

(65) Prior Publication Data
US 2004/0094472 A1 May 20, 2004

(30) Foreign Application Priority Data
Sep. 5, 2000 (NL) .............................. 1016107

(51) Int. Cl.[7] .............................. A23F 3/00; A23L 2/54; A23L 31/40; A23L 31/44; A23L 31/46
(52) U.S. Cl. .......................... 99/323.1; 99/275; 99/279; 99/293; 99/452; 99/453
(58) Field of Search .......................... 99/495, 452–455, 99/275, 295, 304, 307, 293, 294, 279, 287, 323.1, 323.3, 281–286, 300, 300 R, 291; 261/78.1, 121.1, DIG. 16, DIG. 76; 366/101, 163.1, 163.2, 167.1; 426/477

(56) References Cited

U.S. PATENT DOCUMENTS

| | | | |
|---|---|---|---|
| 4,903,585 A | * | 2/1990 | Wimmers et al. .............. 99/275 |
| 5,151,199 A | | 9/1992 | Schmidely et al. |
| 5,638,740 A | * | 6/1997 | Cai .............................. 99/295 |
| 5,759,604 A | * | 6/1998 | Bottlinger et al. .......... 426/433 |
| 6,119,582 A | * | 9/2000 | Akkerman-Theunisse et al. ......................... 99/323.1 |

FOREIGN PATENT DOCUMENTS

| | | |
|---|---|---|
| EP | 0 709 131 A | 5/1996 |
| EP | 0 878 158 A | 11/1998 |

* cited by examiner

Primary Examiner—Timothy F. Simone
(74) Attorney, Agent, or Firm—Altera Law Group, LLC

(57) ABSTRACT

The invention relates to an apparatus for preparing a coffee extract with a fine-bubble froth layer, provided with at least one inlet (2) to which coffee extract is supplied, at least one outlet (4.1; 4.2) for dispensing the coffee extract with the fine-bubble froth layer and at least one liquid flow path (6) extending from the at least one inlet to the at least one outlet (2) and along which, in use, the coffee extract flows from the at least one inlet to the at least one outlet (4.1; 4.2), while in the at least one liquid flow path a buffer reservoir is included with an upright sidewall and a bottom, the at least one inlet being provided with at least one spout opening for generating at least one coffee extract is supplied to the at least one inlet. According to the invention, in the buffer reservoir, a liquid flow decelerating barrier located at a distance from the upright sidewalls is included.

23 Claims, 3 Drawing Sheets

APPARATUS FOR PREPARING A COFFEE EXTRACT WITH A FINE-BUBBLE FROTH LAYER USING A LIQUID FLOW DECELERATING BARRIER

This invention relates to an apparatus for preparing a coffee extract with a fine-bubble froth layer, provided with at least one inlet to which coffee extract is supplied, at least one outlet for dispensing the coffee extract with fine-bubble froth layer and at least one liquid flow path extending from the at least one inlet to the at least one outlet and along which, in use, the coffee extract flows from the at least one inlet to the at least one outlet, while in the liquid flow path a buffer reservoir is included with an upright sidewall and a bottom, the at least one inlet being provided with at least one spout opening for generating at least one coffee extract jet which, in use, squirts into the buffer reservoir when the coffee extract is supplied to the at least one inlet.

Such an apparatus is known from European patent application No. 0 878 158.

It appears that such an apparatus is especially satisfactory for preparing a coffee extract with a fine-bubble froth layer (also called café crème). The fine-bubble froth layer are coffee bubbles which are filled with air.

Although the respective apparatus is very satisfactory, the invention aims to improve the apparatus in the sense that the range of the flow rate of the at least one coffee extract jet, in which a uniform fine-bubble froth layer is formed, is increased. In particular, the invention aims to provide that a same or comparable fine-bubble froth layer is formed when the flow rate mentioned increases. Variation of the flow rate, more in particular increase of the flow rate, can be a result of, for instance, ageing of the apparatus. Often, the apparatus is provided with means known per se for supplying coffee extract, under pressure, to the inlet. These means, known per se, such as a "Napolitane" apparatus, or an apparatus comprising a pump for generating pressure, have as a property that the pressure of the coffee extract can vary. This variation can be related to the age of the apparatus. However, this variation is even more strongly related to the thickness of the coffeebed through which hot water has to be pressed for obtaining the coffee extract which is supplied to the at least one inlet. With an increase of the thickness, the pressure drop across the coffeebed will increase, resulting in a decrease of the pressure of the coffee extract being supplied to the inlet. Conversely, the pressure of the coffee extract which is supplied to the inlet will increase when the thickness of the coffee bed decreases. As a result, the flow rate of at least one coffee extract jet will increase. Also, when the grain size of the ground core of the coffee bed increases, the pressure will increase. As a result, the flow rate of the at least one coffee extract jet will increase. It is, therefore, an object of the invention to render the characteristic properties of the fine-bubble both layer formed less dependent on the flow rate of the coffee extract jet and hence less dependent on the pressure of the coffee extract being supplied to the inlet. In this manner, it is achieved that the apparatus can function well when coffeebeds with a varying thickness and grain size are used, and with apparatuses whose pressure of the coffee extract supplied to the inlet, varies.

To that end, the apparatus according to the invention is characterized in that in the buffer reservoir a liquid flow decelerating barrier, located at a distance from the upright sidewalls, is included.

The liquid flow decelerating barrier has as a result that the magnitude of liquid flows and their associated turbulences in the buffer reservoir decreases and is suppressed. It appears that even when the flow rate of the coffee extract jet increases substantially, the magnitude of the flow and its associated turbulences in the buffer reservoir increase only little. The result of this, in turn, is that the coffee extract is formed with a fine-bubble froth layer comparable to that with the lower flow rate of the at least one coffee extract jet.

Preferably, the liquid flow decelerating barrier disposed between a central part of the buffer reservoir and the upright sidewall so that a liquid flow from the central part in the direction of the upright sidewalls and vice versa is limited.

In particular, the at least one coffee extract jet is directed towards the central part. The coffee extract jet, directed towards the central part will bring about the liquid flow from the central part in the direction of the upright sidewalls of the buffer reservoir. The magnitude of this liquid flow and the associated turbulence is limited in that this liquid flow finds the liquid flow decelerating barrier in its path. Preferably, the buffer reservoir is provided with at least one liquid discharge path for discharging coffee extract from the buffer reservoir to the at least one outlet, the at least one liquid discharge path having its origin, viewed from the central part, outside the liquid flow decelerating barrier. Thus, it is achieved that all liquid which is supplied via the at least one coffee extract jet to the buffer reservoir has to pass the liquid decelerating barrier in order to be able to leave the buffer reservoir. The action of the liquid flow decelerating barrier is therefore very efficient.

In particular, the liquid flow decelerating barrier extends along a first, closed curve, extending around the central part. It has appeared that with such an embodiment, in a particularly efficient manner, the liquid flow and the associated turbulence within the buffer reservoir, is suppressed.

Furthermore, it is preferred that the liquid flow decelerating barrier extends along a second closed curve extending at a distance around the first curve. It has appeared that with such an embodiment, in an especially efficient manner, the liquid flow and the associated turbulence in the buffer reservoir are suppressed. Furthermore, in particular, the liquid flow decelerating barrier is provided with a number of obstacles, spaced apart and extending upward from the bottom of the buffer reservoir. These obstacles can, for instance, be pin-shaped. It is also possible that the liquid flow decelerating barrier be provided with a gauze wall extending from the bottom of the buffer reservoir in a direction away from the bottom. Such a liquid flow decelerating barrier also proves to function well.

It is further preferred that at least a part of the bottom is provided with a roughened surface structure. It appears that, on the one hand, also with flow rates of the at least one liquid jet which are smaller than those used in the know apparatus, the roughened surface brings about that a uniform fine-bubble froth layer is obtained. Therefore, this feature also has as a result that the range of the flaw rate of the at least one coffee extract jet, with which, in the known apparatus, a comparable fine-bubble froth layer is obtained, is increased in relation to the known apparatus. Additionally, the roughened surface structure has as an advantage that a more uniform fine-bubble froth layer is obtained, i.e. that the variation in diameter of the bubbles formed is smaller than with the known apparatus if it were to have dimensions comparable to the apparatus according to the invention.

According to the invention, therefore, it is achieved that, at equal dimensions of the apparatus according to the invention and the known apparatus, with the apparatus according to the invention a more uniform fine-bubble froth layer is formed at a range of flow rates of the coffee extract jet which is larger than the range of flow rates of the coffee extract jet with the known apparatus. Here, the liquid flow decelerating barrier has as a particular result that the maximum of the range is increased, while the roughened surface structure particularly results in the minimum of the range being enlarged.

In particular, the apparatus is provided with two outlets, the liquid flow path extending from the inlet to the first outlet and to the second outlet. It appears that the liquid flow decelerating barrier has as an additional advantage that with such an apparatus, to the two outlets, approximately the same amount of coffee extract with a fine bubble froth layer is supplied. If each of the outlets is to fill one cup, both cups will now be filled substantially equally. All this can be explained in that the magnitude of the liquid flow and the associated turbulences in the buffer reservoir has decreased as a result of the liquid flow decelerating barrier. The liquid surface in the buffer reservoir is calmer and will, therefore, be more evenly distributed over two liquid discharge paths for discharging coffee extract from the buffer reservoir to the first and second outlet, respectively.

The invention will presently be further elucidated with reference to the drawing. In the drawing.

Figure 1:
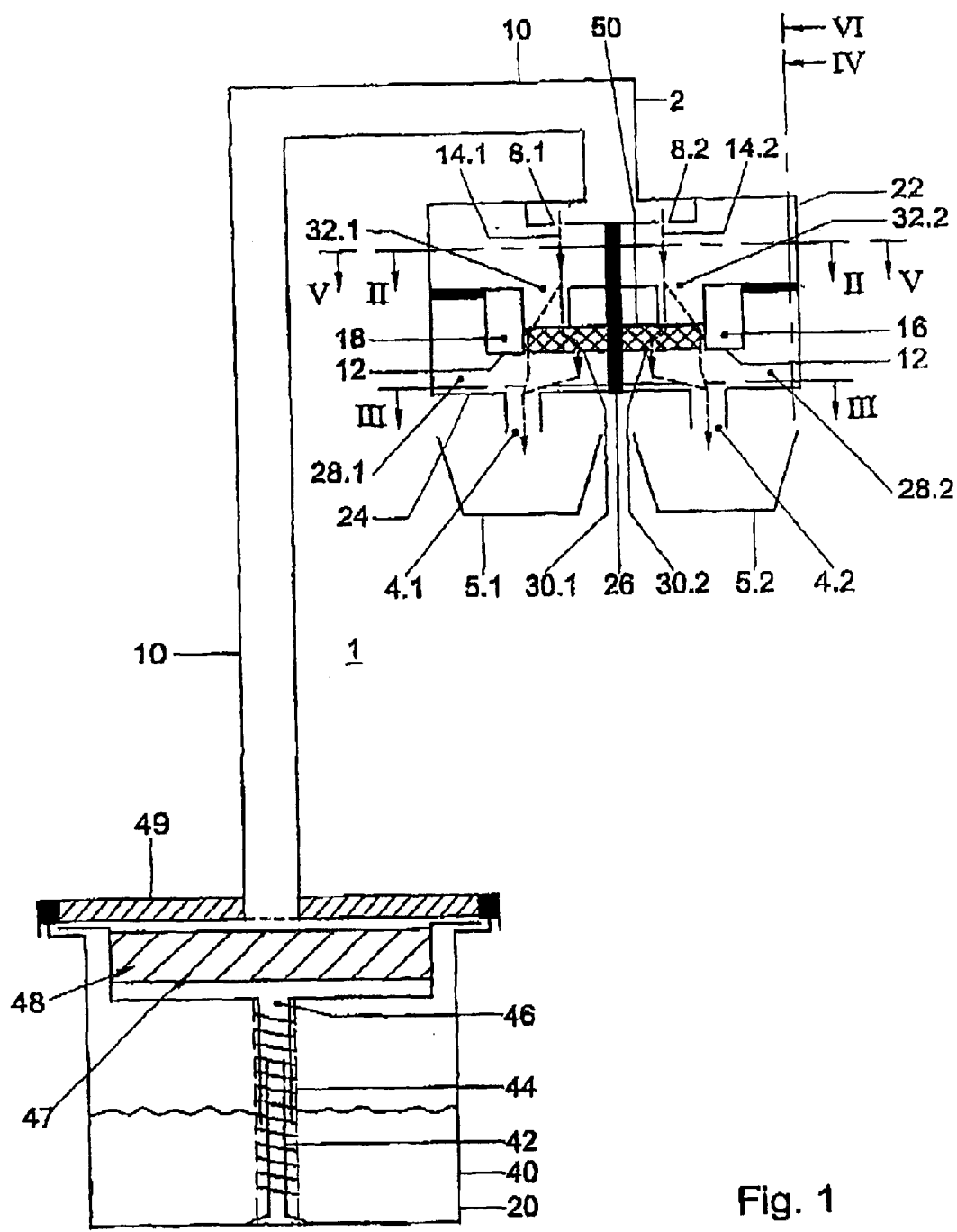
FIG. 1 shows a transparent view of a first and second embodiment of an apparatus according to the invention.

In FIG. 1 reference numeral (1) designates an apparatus for preparing a coffee extract with a fine-bubble froth layer. The apparatus is provided with at least one inlet (2), to which coffee extract can be supplied. Further, the apparatus comprises a first outlet (4.1) and a second outlet (4.2) for dispensing the coffee extract with the fine-bubble froth layer. In use, under each outlet (4.1) and (4.2) a cup (5.1) and (5.2) can be placed to be filled with the coffee extract with the fine-bubble froth layer (café crème). It is also possible that a single cup is placed under both outlets (4.1) and (4.2), so that only one cup is filled from both outlets.

The apparatus comprises at least one liquid flow path (6) which extends from the at least one outlet (2) to the outlets (4.1) and (4.2). In use, the coffee extract flows from the at least one outlet (2) along the liquid flow path (6) to the first and the second outlet (4.1) and (4.2). The inlet (2) in this example is provided with a first and second spout opening (8.1) and (8.2), which are each arranged for generating a liquid coffee extract jet when coffee extract is supplied, in the example via a duct (10), to the inlet (2).

In the liquid flow path (6), a buffer reservoir (16) with a bottom (12) and an upright sidewall (18) is included, the arrangement being such that in use the coffee extract jets (14.1) and (14.2) generated by the two spout openings spout towards the bottom (12) when the coffee extract is supplied under pressure via the duct (10) to the inlet (2).

As a consequence of all this, in use, the coffee extract jets (14.1) and (14.2) spout into the buffer reservoir. Further, it holds in this example that at least a part of the bottom (12) is provided with a roughened surface structure. In this example, the entire bottom (12) is provided with a roughened surface structure. However, the bottom may also be smooth.

The apparatus further comprises means (20), known per se, for generating the coffee extract and for supplying the coffee extract to the duct (10) at a pressure of, for instance, 0.3 to 3 atmosphere. The inlet with the spout openings brings about an increase of the flow velocity relative to the flow velocity of the coffee extract in the duct (10). To that end, the surface area of each of the spout openings (8.1) and (8.2) equals, for instance, 0.05–0.5 mm$^2$.

The buffer reservoir (16) in this example is situated in a housing (22). The housing (22) comprises a bottom (24) with the outlets (4.1) and (4.2). Further, within the housing (22), outside the buffer reservoir (16), a partition (26) is arranged which divides a space in the middle of the housing (22), outside the buffer reservoir (16), into two mutually separate parts (28.1) and (28.2). The arrangement is such that the outlet (4.1) is in fluid communication with the first part (28.1) of the housing (22). Further, the outlet (4.2) is in fluid communication with the second part (28.2) of the housing (22). Further, in the bottom (12) of the buffer reservoir a first and a second drain opening (80.1) and (80.2) are provided. The first drain opening (30.1) forms a fluid communication between the inside of the buffer reservoir (16) and the first part (28.1) of the housing (22). Further, the second drain opening (30.2) provides a fluid communication between the insides of the buffer reservoir (16) and the second part (28.2) of the housing (22).

In the upright sidewall (18) of the buffer reservoir, a first through-flow opening (32.1) is provided which extends from an upper side of the sidewall in the direction of the bottom (12). The first through-flow opening (32.1), however, does not extend as far as the bottom (12) and therefore constitutes an overflow from the buffer reservoir (16) to the first part (28.1) of the housing (22). Similarly, in the upright sidewall (18) of the buffer reservoir (16) a second through-flow opening (32.2) is provided which constitutes an overflow from the buffer reservoir (16) to the second part (28.2) of the housing (22).

The apparatus (20), know per se, for preparing the coffee extract is provided, in this example, with a container (40) which in use is filled with water. In the container (40) a heating element (42) is arranged. The heating element (42) is arranged around a riser pipe (44) which terminates in the bottom of a sachet holder (46). In use, the sachet holder (46) accommodates a sachet (47), made, for instance, of filtering paper, which is filled with ground coffee (48). Placed on top of the sachet holder (46) is a lid (49) by which the reservoir (40), with the sachet holder (46) accommodated therein, is then closed off vapor-tightly. The duct (10) is in communication via the lid (49) with an inner space of the container (40).

Figure 2:
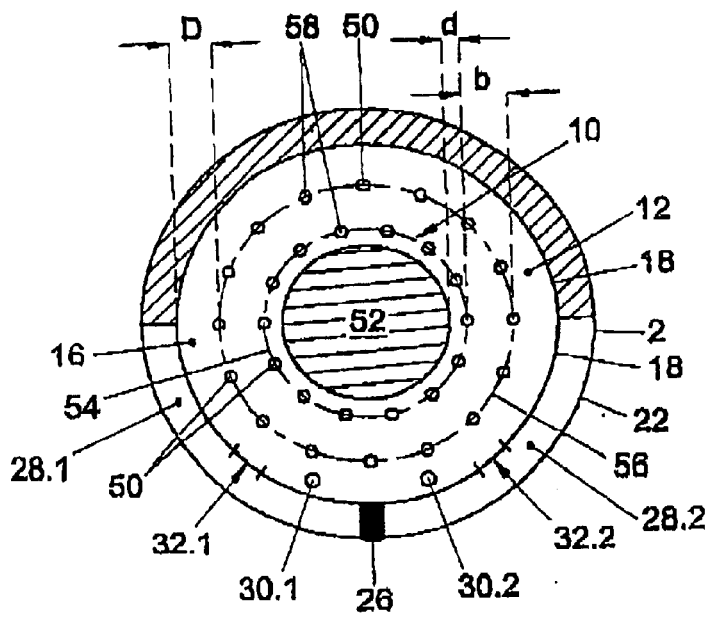
FIG. 2 shows a cross section of a portion of the first embodiment of the apparatus according to FIG. 1.
Figure 3:
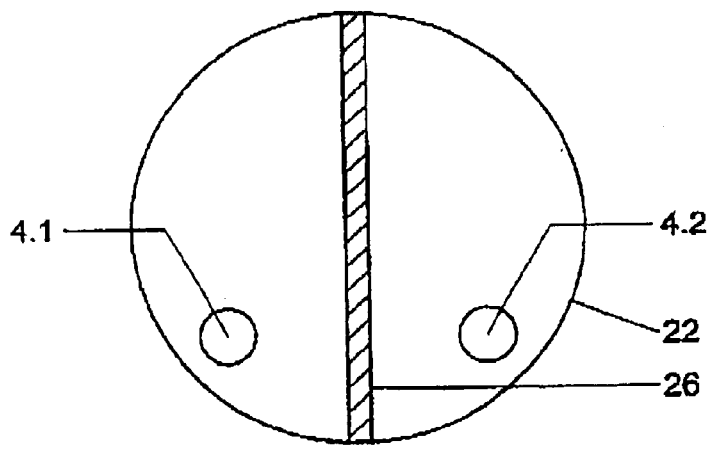
FIG. 3 shows a cross section of a portion of the first and second embodiment of the apparatus according to FIG. 1.
Figure 4:
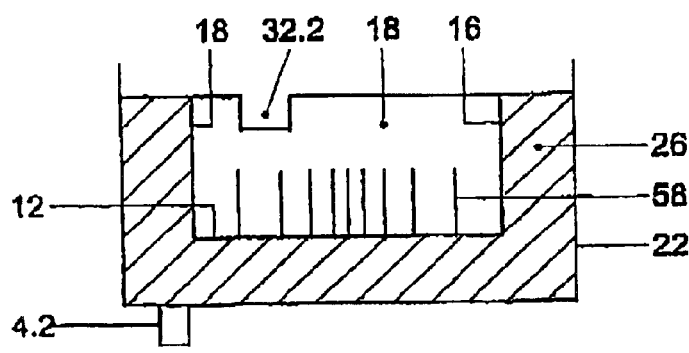
FIG. 4 shows a cross section of a portion of the first embodiment of the apparatus according to FIG. 1.

Arranged in the buffer reservoir, further, is a liquid flow decelerating barrier (50) located at a distance from the upright sidewalls (18), indicated only schematically in FIG. 1. The function of the liquid flow decelerating barrier is to reduce liquid flows and turbulences which in use occur on a macroscale (i.e. for instance, a liquid flow from the central portion in the direction of the upright sidewall and vice versa) in the buffer reservoir. As can be properly seen in FIG. 2, the liquid flow decelerating barrier is included between a central portion (52) of the buffer reservoir, horizontally hatched in the drawing, and the upright sidewalls (18), so that a liquid flow from the central portion in the direction of the upright sidewalls and vice versa is limited. The smallest distance between the liquid flow decelerating barrier (50) and the upright sidewall is indicated in FIG. 2 by the 'D'. Similarly, the smallest distance between the liquid flow decelerating barrier (50) and the central portion (52) is indicated in FIG. 2 by 'd'. In the example, the coffee extract jets (14.1) and (14.2) are directed towards the central portion (52). Accordingly, they will strike this central portion (52) depending on the height of the liquid level.

The drain openings (30.1) and (30.2) are situated between the upright sidewall (18) and the liquid flow decelerating barrier (50). As a consequence, the drain openings (30.1) and (30.2) as well as the through-flow openings (32.1) and (32.2) constitute liquid discharge paths for discharging coffee extract from the buffer reservoir to the outlets (4.1) and (4.2), these liquid discharge paths finding their origin outside, viewed from the central portion, the liquid flow decelerating barrier (50).

In this example the liquid flow decelerating barrier (50) extends along a first closed curve (54) extending around the central portion (52). In this example, the closed curve (54) is a circle. Further, the liquid flow decelerating barrier extends along a second closed curve (56), which extends around the first curve (54) at a distance 'b'. In this example, the liquid flow decelerating barrier (50) is provided with a number of spaced apart obstacles (58) extending upwards from the bottom of the buffer reservoir. In this example, the obstacles are of pin-shaped design. Each obstacle can therefore consist of, for instance, a metal pin which reaches upwards from the bottom (12). The height of the pin can be equal, for instance, to the total height of the buffer reservoir or the height of the buffer reservoir adjacent the through-flow openings (32.1) and (32.2). However, the pips can also be lower than the height of the buffer reservoir adjacent the through-flow openings (32.1) and (32.2).

In this example, the pin-shaped obstacles (58) are disposed both on the first curve (54) and on the second curve (56), which is likewise of circular design.

The apparatus described up to this point works as follows. The reservoir (40) is filled with water. Next, with the aid of the heating element (42) the water is heated. As a result, the vapor pressure in the container (40) will rise. The result is that the heated water in the riser pipe (44) is forced up towards the sachet holder (46). In the sachet holder (46), the water, hot by now, will be forced through the sachet (47). This yields coffee extract which is supplied under pressure to the duct (10). Under pressure, the coffee extract flows to the inlet (2). The coffee extract which is supplied under pressure to the inlet (2) squirts out via the spout openings (8.1) and (8.2), respectively. Thus, a first coffee extract jet (14.1) spouts towards the bottom (12) in the buffer reservoir (16). Similarly, a second coffee extract jet (14.2) spouts to the bottom (12) of the buffer reservoir (16). When the coffee extract jets strike the bottom (12), then, as a result of the impingement on the bottom (12), already some bubbles will be formed. Next, the buffer reservoir (16) will proceed to fill to some extent with the coffee extract. In this example, the drain openings (30.1) and (30.2) have such dimensions that, in use, per unit time, more coffee extract is supplied to the buffer reservoir (12) via the spout openings (8.1) and (8.2) than is discharged from the buffer reservoir via the drain openings (30.1) and (30.2). Thus a layer of coffee extract is formed in the buffer reservoir. The apparatus is designed such that in use in the buffer reservoir a layer of coffee extract is formed, while the at least one coffee extract jet spouts into the layer of coffee extract that has been formed in the buffer reservoir. The height of the liquid level in the buffer reservoir can be, for instance, at least 5 mm. Other values are also possible, however. The coffee extract jets (14.1) and (14.2) then squirt onto the liquid surface of the coffee extract present in the buffer reservoir (16). As a result of a complex of factors, such as the coffee extract jets that squirt into the liquid, the coffee extract jets which albeit depending on the height of the liquid level in the buffer reservoir, spout against the bottom (12), and the optionally roughened surface structure of the bottom which causes local turbulences on a microscale, a fine-bubble froth layer is formed on the coffee extract. Also, the roughened bottom, once a layer of coffee extract is present in the buffer reservoir, has the function in particular of limiting or reducing the liquid flows in the buffer reservoir. When the liquid level has risen sufficiently, this will flow via the through-flow opening (32.1) to the first part (28.1) of the housing (22). Via the first part (28. 1) the coffee extract then flows via the outlet (4.1) into the cup (5.1). At the same time, coffee extract with a fine-bubble froth layer will flow via the opening (32.2) in the upright sidewall (18) to the second part (28.2) of the housing (22). From the second part (28.2), the coffee extract with a fine-bubble froth layer will flow via the outlet (4.2) to the cup (5.2).

It appears that by virtue of the fact that the bottom is provided with a roughened surface structure, given a coffee extract jet (14.1) comprising a flow rate of only 4 grams per second, already a predictable stable fine-bubble froth layer is formed on the coffee extract. The same applies to the coffee extract jet (14.2). In this example, the apparatus (23) is so dimensioned that each of the coffee extract jets comprises a flow of 6 grams per second. As a result of all this, even when the flow rates of the coffee extract jets will vary to some extent, and, for instance, in the courses of time, or whatever reason, decrease, still the same kind of coffee extract with a fine-bubble froth layer is formed. The formation of coffee extract with a fine-bubble froth layer is therefore predictable. Moreover, it appears that by virtue of the roughened surface, the fine-bubble froth layer has a relatively homogeneous structure. This is to say that the range of diameters of formed bubbles is relatively small. Experts accordingly refer to a fine-bubble froth layer of a uniform character.

When upon elapse of a predetermined time the apparatus (20) stops supplying coffee extract to the inlet (2), the coffee extract jets (14.1) and (14.2) will be interrupted. The buffer reservoir can then drain entirely via the drain openings (30.1) and (30.2). Thus, the buffer reservoir drains towards the outlets (4.1) and (4.2).

Due to the fact that in use the openings (32.1) and (32.2) are overflowed to an equal extent and the drain openings (30.1) and (30.2) are flowed through to an equal extent, the cups (5.1) and (5.2) will be filled with a presently substantially equal amount of coffee extract.

Preferably, it holds that the surface structure of the surface (12) has a surface roughness corresponding to the surface roughness of sandpaper comprising particles having an average diameter of 50 to 2000 microns. In particular, it holds that the surface structure has a surface roughness corresponding to the surface roughness of sandpaper in the range of P12 to P300. Preferable, it holds that the surface structure has a surface roughness corresponding to the surface roughness of sandpaper in the range of P120 to P300.

Naturally, the roughness of the surface structure of the bottom (12) can also be determined with other parameters. Thus, the surface structure can also have a surface roughness Ra in a range of 50 to 2000 um. Preferably, however, Ra has a range of 50 to 200um.

The roughened surface structure can be provided in various ways. To be considered here are, for instance, a surface which has been subjected to a spark treatment. It is also possible that the surface (12) has been sand-blasted. In addition, it is possible that the surface has been chemically etched. A combination of these techniques is also possible.

Figure 5:
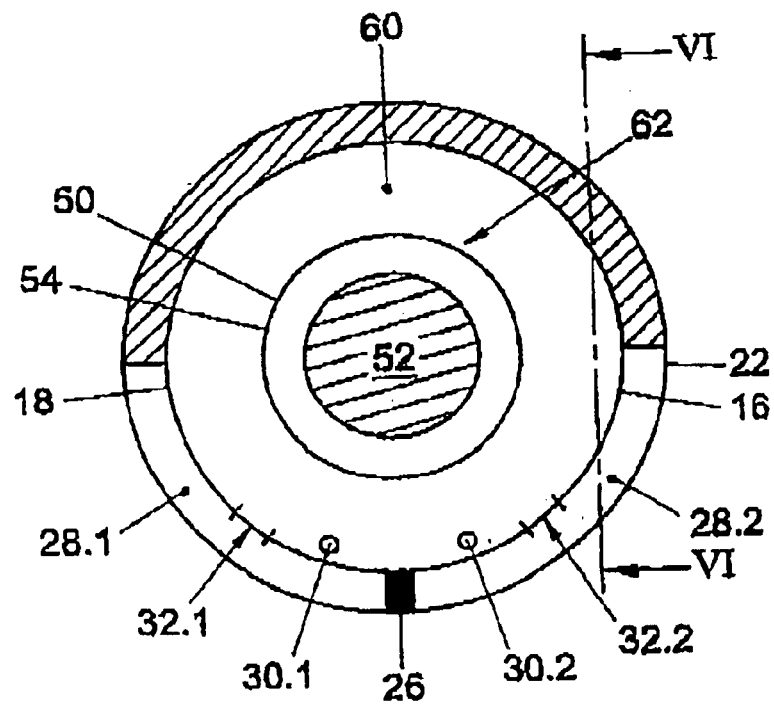
FIG. 5 shows a cross section similar to FIG. 2 of a portion of the second embodiment of the apparatus according to FIG. 1.

It is also possible that along the surface (12) a gauze (60) is arranged for obtaining the roughened surface structure. This is shown in FIG. 5. A gauze could be, for instance, a fabric of metal wires hang a pitch distance and a diameter of the metal wires respectively corresponding to the pitch and the diameter of wires of bandaid fabric. This metal fabric can be provided on the bottom of the buffer reservoir by means of glue, for instance. It is also possible that on the gauze, in turn, a thin plastic covering layer or a coating has been provided. In effect, however, the bottom (12) will have a roughened surface structure.

The effect of the liquid flow decelerating barrier can be described as follows. When the coffee extract jets (14.1) and (14.2) spout into the buffer reservoir, they cause large currents in the buffer reservoir which are accompanied by large turbulences. This translates into a vehemently whirling liquid surface in the buffer reservoir. It has been found that this vehemently whirling liquid surface has as a result that the possible range of the flow rate of each of the coffee extract jets at which a uniform and predictable fine-bubble froth layer is formed, is limited. One can think of, for instance, a flow rate of 5 grams per second to 5.5 grams per second, at which a uniform, even fine-bubble froth layer is formed. If the flow rate for whatever reason increases or decreases, a deviant or non fine-bubble froth layer will be formed.

The liquid flow decelerating barrier, however, has as a consequence that the magnitude of the liquid flows within the buffer reservoir (16) and the attendant turbulences are reduced. It appears that the range of the flow rates of each of the coffee extract jets (14.1) and (14.2) at which the desired uniform fine-bubble froth layer is still obtained, is enlarged. The maximum of the range is raised to, for instance, 7 grams per second. At the same time, the bottom (12) with its roughened surface structure has as a result that the minimum of the range is lowered to 4.5 grams per second. Thus the range of the flow rates of the coffee extract jets is enlarged considerably by virtue of the liquid flow decelerating barrier. The roughened surface structure enhances this effect.

The liquid flaw decelerating barrier is used particularly effectively in that all coffee extract must in principle pass the liquid flow decelerating barrier (50), because on the one hand the coffee extract jets (14.1) and (14.2) are directed to the central portion (52) and on the other hand the drain openings (30.1) and (30.2) as well as the through-flow openings (32.1) and (32.2) are located outside, viewed from the central portion (52), the liquid flow decelerating barrier. In other words, the coffee extract with the fine-bubble froth layer can leave the buffer reservoir via liquid discharge paths whose origin, viewed from the central portion, is located outside the liquid flow decelerating barrier.

The liquid flow decelerating barrier (50) moreover has the advantage that coffee extract with the fine-bubble froth layer will flow in an equal amount from the buffer reservoir to the first and second outlet (4.1) and (4.2), so that the cups (5.1) and (5.2) will presently be filled substantially equally. This is directly related to the fact that by virtue of the liquid flow decelerating barrier, the liquid surface in the buffer reservoir is relatively calm and will swirl little owing to the suppressed turbulence and liquid flows in the buffer reservoir.

Figure 6:
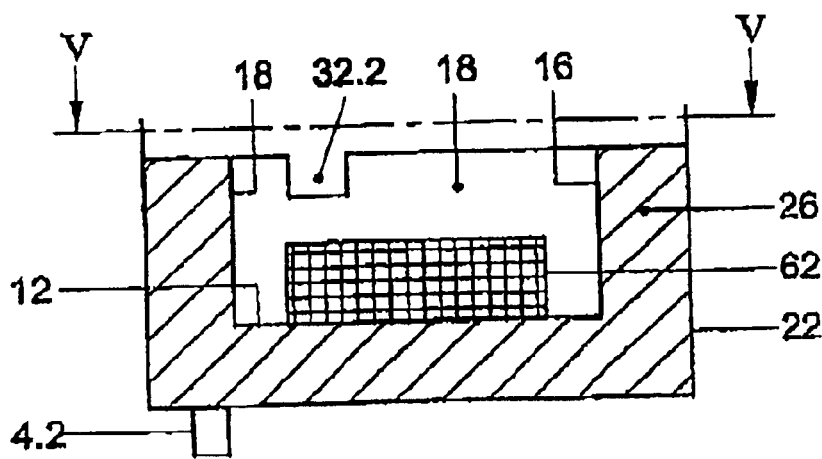
FIG. 6 shows a cross section similar to FIG. 4 of a portion of the second embodiment of the apparatus according to FIG. 1.

Referring to FIGS. 1, 5 and 6, presently a second possible embodiment of the apparatus 1 according to the invention will be discussed. Parts corresponding with the first embodiment are provided with the same reference numerals. In this apparatus, the bottom (12) of the liquid reservoir (16) is provided with the earlier mentioned gauze (60) for obtaining the surface with a roughened surface structure, as discussed hereinbefore. Further, however, the liquid flow decelerating barrier (50) is provided with an upright gauze wall (62) extending from the bottom (12) of the buffer reservoir (16) away from the bottom. The gauze wall (62) extends along the first curve (54). In this example, no gauze extends along the second curve (56). The gauze wall (62) therefore constitutes a cylinder wall manufactured from gauze, through which the coffee extract present in the buffer reservoir (16) can flow. The gauze wall consists, for instance, of wires of a diameter of 0.3 millimeter. These wires have been woven according to a linen binding with a pitch of 1.5 millimeter. The function of the gauze wall is entirely comparable with the functions of the pin-shaped projections (58) of the apparatus according to FIG. 2, and will therefore not be elucidated here.

The invention is not limited in any way to the exemplary embodiments outlined hereinbefore.

Thus, the bottom (12) of the buffer reservoir according to the FIGS. 1 to 6, viewed from above, can be of slightly convex design. This promotes drainage via the drainage opening (30.1) and (30.2). Also, the apparatus does not need to be provided with a bottom having a roughened surface structure. The bottom may therefore, for instance, be of smooth design. Also, only a part of the bottom 12 may be provided with the roughened surface structure. This part can coincide, for instance, with the area 52 and/or lie within the curve 54. Also, in the apparatus according to FIGS. 1 to 6, the inlet (2) can be designed with only one spout opening (8.1), which is then located, for instance, in the middle of the inlet (2). Thus, only one coffee extract jet (14.1) is spouted into a buffer reservoir. The fine-bubble froth layer, however, is formed in an entirely analogous manner. Also, the cups (5.1) and (5.2) will be filled from the buffer reservoir, respectively, via the drain openings (28.1) and (28.2), the through-flow openings (30.1) and (30.2), and the outlets (4.1) and (4.2), as has been discussed hereinbefore.

In the apparatus according to FIGS. 1 to 6, the bottom (12) of the buffer reservoir can coincide with the bottom (24) of the holder. In that case, however, the drain opening (30.1) and the through-flow opening (32.1) should be located above the outlet (4.1), and the drain opening (30.2) and the through-flow opening (32.2) should be located above the outlet (4.2). The portion of the partition (26) which is located in FIG. 1 between the bottom (12) and the bottom (24) is absent in that embodiment. Also, the through-flow openings (32.1) and (32.2) can be omitted. The drain openings (30.1) and (30.2) can then be enlarged to prevent the buffer reservoir overflowing while yet a layer of extract is formed in the buffer reservoir.

The normal of the bottom (12) of the buffer reservoir (16) can include an angle A with each of the coffee extract jets, which for instance, is smaller than 80 degrees, for instance equal to 45 degrees, and preferably equal to zero degrees. Further, the sachet holder (46) and the sachet (47) can be replaced with the assembly of European patent 0 904 717. The opening in the bottom of the holder from the European patent 0 904 717 may then be further provided with a spout opening (nozzle) such as, for instance, the spout opening (18.1) described. The buffer reservoir may also be designed as described in Dutch patents 1012847 and 1013270 while additionally the liquid flow decelerating barrier is arranged and optionally the roughened surface. In the examples discussed here, the outlets each consist of an opening. This is not requisite. An outlet can also consist of the through-flow opening (32.1) or (32.2), the drain opening (30.1) or (30.2) or another part. Such variants are all understood to fall within scope of the invention.

What is claimed is:

1. An apparatus for preparing a coffee extract with a fine-bubble froth layer, provided with at least one inlet to which coffee extract is supplied, at least one outlet for dispensing the coffee extract with the fine-bubble froth layer and at least one liquid flow path extending from the at least one inlet to the at least one outlet and along which, in use, the coffee extract flows from the at least one inlet to the at least one outlet, while in the at least one liquid flow path a buffer reservoir is included with an upright sidewall and a bottom, the at least one inlet being provided with at least one spout opening for generating at least one coffee extract jet which, in use, squirts into the buffer reservoir when the coffee extract is supplied to the at least one inlet, characterized in that in the buffer reservoir a liquid flow decelerating barrier located at a distance from the upright sidewalls is included.

2. An apparatus according to claim 1, characterized in that the liquid flow decelerating barrier is included between a central part of the buffer reservoir and the upright sidewalls, so that a liquid flow from the central part in the direction of the upright walls is limited.

3. An apparatus according to claim 2, characterized in that the at least one coffee extract jet is directed towards the central part.

4. An apparatus according to claim 3, characterized in that the buffer reservoir is provided with at least one liquid discharge path for discharging coffee extract from the buffer reservoir to the at least one outlet, the at least one liquid discharge path having its origin, viewed from the central part, outside the liquid flow decelerating barrier.

5. An apparatus according to claim 2, wherein the liquid flow decelerating barrier extends along a first closed curve, extending around the central part.

6. An Apparatus according to claim 5, characterized in that the liquid flow decelerating barrier further extends along a second closed curve, extending at a distance around the first curve.

7. An apparatus according to claim 1, wherein the liquid flow decelerating barrier is provided with a number of obstacles, located at a distance from one another, extending upwards from the bottom of the buffer reservoir.

8. An apparatus according to claim 7, characterized in that the obstacles are pin-shaped.

9. An apparatus according to claim 1, wherein the liquid flow decelerating barrier is provided with a gauze wall extending away from the bottom of the buffer reservoir.

10. An apparatus according to claim 1, wherein the bottom, at least partly, is provided with a roughened surface structure.

11. An apparatus according to claim 10, characterized in that the surface structure has a surface roughness corresponding to the surface roughness of sandpaper comprising parts with an average diameter of 50–2000 $\mu$m.

12. An apparatus according to claim 11, characterized in that the surface structure has a surface roughness corresponding to the surface roughness of sandpaper in the range of P12 to P600.

13. An apparatus according to claim 12, characterized in that the surface structure has a surface roughness corresponding to the surface roughness of sandpaper in the range of P60 to P300.

14. An apparatus according to claim 12, characterized in that the surface structure has a surface roughness-RA of 50–2000 $\mu$m.

15. An apparatus according to claim 14, characterized in that the surface structure has a surface roughness-RA of 50–200 $\mu$m.

16. An apparatus according to claim 10, wherein the bottom has been subjected to a spark treatment.

17. An apparatus according to claim 10, wherein the bottom has been sandblasted.

18. An apparatus according to claim 10, wherein the bottom has been chemically etched.

19. An apparatus according to claim 10, wherein on the bottom, a gauze is provided far obtaining the roughened surface structure.

20. An apparatus according to claim 1, wherein a normal of the bottom includes an angle A with the coffee extract jet which is smaller than 80 degrees.

21. An apparatus according to claim 20, characterized in that the normal of the bottom includes an angle A with the coffee extract jet which is approximately equal to 45 degrees.

22. An apparatus according to claim 20, characterized in that the normal of the surface includes an angle A with the coffee extract jet which is approximately equal to zero degrees.

23. An apparatus according to claim 1, wherein the apparatus is further provided with means for preparing the coffee extract and for supplying, under pressure, the coffee extract to the at least one inlet.

* * * * *